United States Patent
Blasco Serrano et al.

(10) Patent No.: US 11,057,886 B2
(45) Date of Patent: **\*Jul. 6, 2021**

(54) DEVICE-TO-DEVICE TRANSMISSION USING RADIO RESOURCES OF A RADIO ACCESS NETWORK

(71) Applicant: Telefonaktiebolaget LM Ericsson (publ), Stockholm (SE)

(72) Inventors: Ricardo Blasco Serrano, Espoo (FI); Marco Belleschi, Solna (SE); Hieu Do, Järfälla (SE); Stefano Sorrentino, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 148 days.

This patent is subject to a terminal disclaimer.

(21) Appl. No.: 16/437,905

(22) Filed: Jun. 11, 2019

(65) Prior Publication Data

US 2019/0297623 A1    Sep. 26, 2019

Related U.S. Application Data

(63) Continuation of application No. 15/553,368, filed as application No. PCT/SE2017/050742 on Jul. 4, 2017, now Pat. No. 10,362,572.

(Continued)

(51) Int. Cl.
*H04W 72/04* (2009.01)
*H04W 56/00* (2009.01)
*H04B 7/26* (2006.01)

(52) U.S. Cl.
CPC ...... *H04W 72/0446* (2013.01); *H04B 7/26* (2013.01); *H04W 56/008* (2013.01);
(Continued)

(58) Field of Classification Search
CPC ...... H04B 7/26; H04B 7/2656; H04B 7/2606; H04W 72/0446; H04W 72/0453;
(Continued)

(56) References Cited

U.S. PATENT DOCUMENTS 9,763,199 B2    9/2017  Pelletier et al.
2016/0037512 A1*  2/2016  Lei .................. H04W 72/04
                                                             370/336

(Continued)

FOREIGN PATENT DOCUMENTS

EP    3010302 A1    4/2016
WO   2016018069 A1  2/2016
WO   2016021933 A1  2/2016

OTHER PUBLICATIONS

Unknown, Author, "Remaining details on resource pool configuration", 3GPP TSG RAN WG1 #86bis, R1-1608992, Lisbon, Portugal, Oct. 10-14, 2016, 1-3.

(Continued)

*Primary Examiner* — Mewale A Ambaye
(74) *Attorney, Agent, or Firm* — Murphy, Bilak & Homiller, PLLC (57) ABSTRACT

The disclosure relates to a method performed by a UE, for using subframes of a radio access network for a D2D communication. The method comprises determining subframes available for D2D communication among subframes of the radio access network. The subframes available for D2D communication exclude a number of subframes of the radio access network, such that a periodicity of the D2D communication in number of subframes divides the number of subframes available for D2D communication. The method also comprises using the determined subframes for enabling D2D communication.

23 Claims, 6 Drawing Sheets

---

Determining subframes available for D2D communication among subframes of the radio access network, the determined subframes excluding a number of subframes of the radio access network  — 650

↓

Using the determined subframe for enabling D2D communication — 660

Identifying a radio resource of the radio access network, based on a mapping of radio resources available for D2D transmission and/or receptions to radio resources within the periodic structure with the first period A — 610

↓

Using the identified radio resource for enabling D2D transmissions and/or receptions — 620

Related U.S. Application Data (60) Provisional application No. 62/374,419, filed on Aug. 12, 2016.

(52) U.S. Cl.
CPC ....... *H04W 72/0453* (2013.01); *H04B 7/2606* (2013.01); *H04B 7/2656* (2013.01)

(58) Field of Classification Search
CPC ............. H04W 56/008; H04W 56/005; H04W 72/044; H04W 72/005; H04W 56/00; H04W 76/24
See application file for complete search history.

(56) References Cited

U.S. PATENT DOCUMENTS

| | | | |
|---|---|---|---|
| 2016/0119921 A1* | 4/2016 | Ma .............................. | H04L 1/00 370/280 |
| 2017/0202007 A1* | 7/2017 | Miao ................... | H04W 74/006 |
| 2017/0222770 A1* | 8/2017 | Liu ....................... | H04B 1/7143 |
| 2017/0230939 A1* | 8/2017 | Rudolf .................... | H04W 4/70 |
| 2017/0317793 A1 | 11/2017 | Jiang et al. | |
| 2018/0376485 A1* | 12/2018 | Kahtava ................ | H04W 28/26 |
| 2019/0045345 A1* | 2/2019 | Lee ........................ | H04L 5/0048 |
| 2020/0137769 A1* | 4/2020 | Sun ....................... | H04W 74/02 |

OTHER PUBLICATIONS

Schlienz, J. et al., "Device to Device Communication in LTE Whitepaper D2D Communication", Sep. 29, 2015, 1-36.

Unknown, Author, "Details on resource pool design", Samsung, 3GPP TSG RAN WG1 #85, R1-164764, Nanjing, China, May 23-27, 2016, 1-5.

Unknown, Author, "Discussion on T-RPT design", ZTE, 3GPP TSG RAN WG1 Meeting #78bis, R1-143820, Ljubljana, Slovenia, Oct. 6-10, 2014, 1-4.

Unknown, Author, "Remaining details of T-RPT design for TDD", ZTE, 3GPP TSG RAN WG1 Meeting #78bis, R1-143821, Ljubljana, Slovenia, Oct. 6-10, 2014, 1-5.

Unknown, Author, "Overview of latest RAN1/2 agreements", 3GPP TSG-RAN WG4 #74 R4-150205, Athens, Greece, Feb. 9-Feb. 13, 2015, pp. 1-5.

Unknown, Author, "Discussion on V2X PC5 Scheduling, Resource Pools and Resource Patterns", 3GPP TSG RAN WG1 Meeting #84bis, R1-162833, Busan, South Korea, Apr. 11-15, 2016, pp. 1-8.

* cited by examiner

DEVICE-TO-DEVICE TRANSMISSION USING RADIO RESOURCES OF A RADIO ACCESS NETWORK

TECHNICAL FIELD

The disclosure relates to a design of pools of resources for D2D and/or V2X communication, and more specifically to a user equipment and a method for using a radio resource of a radio access network for enabling a Device-to-Device (D2D) and/or V2X transmission.

BACKGROUND

3GPP Long Term Evolution (LTE) is the fourth-generation mobile communication technologies standard developed within the $3^{rd}$ Generation Partnership Project (3GPP) to improve the Universal Mobile Telecommunication System (UMTS) standard to cope with future requirements in terms of improved services such as higher data rates, improved efficiency, and lowered costs.

The Evolved Universal Terrestrial Radio Access Network (E-UTRAN) is the radio access network of an LTE system. In an E-UTRAN, a User Equipment (UE) is wirelessly connected to a Radio Base Station (RBS) commonly referred to as an evolved NodeB (eNodeB) in LTE. An RBS is a general term for a radio network node capable of transmitting radio signals to a UE and receiving signals transmitted by a UE. In LTE, the eNodeB manages the radio resources in the cells, and is directly connected to a Core Network (CN), as well as to neighboring eNodeBs via an X2 interface.

During Release 12, the LTE standard has been extended with support of device to device (D2D) (specified as "side-link") features targeting both commercial and Public Safety applications. Some applications enabled by Rel-12 LTE are device discovery, where devices are able to sense the proximity of another device and associated application by broadcasting and detecting discovery messages that carry device and application identities. Another application consists of direct communication based on physical channels terminated directly between devices.

Figure 1:
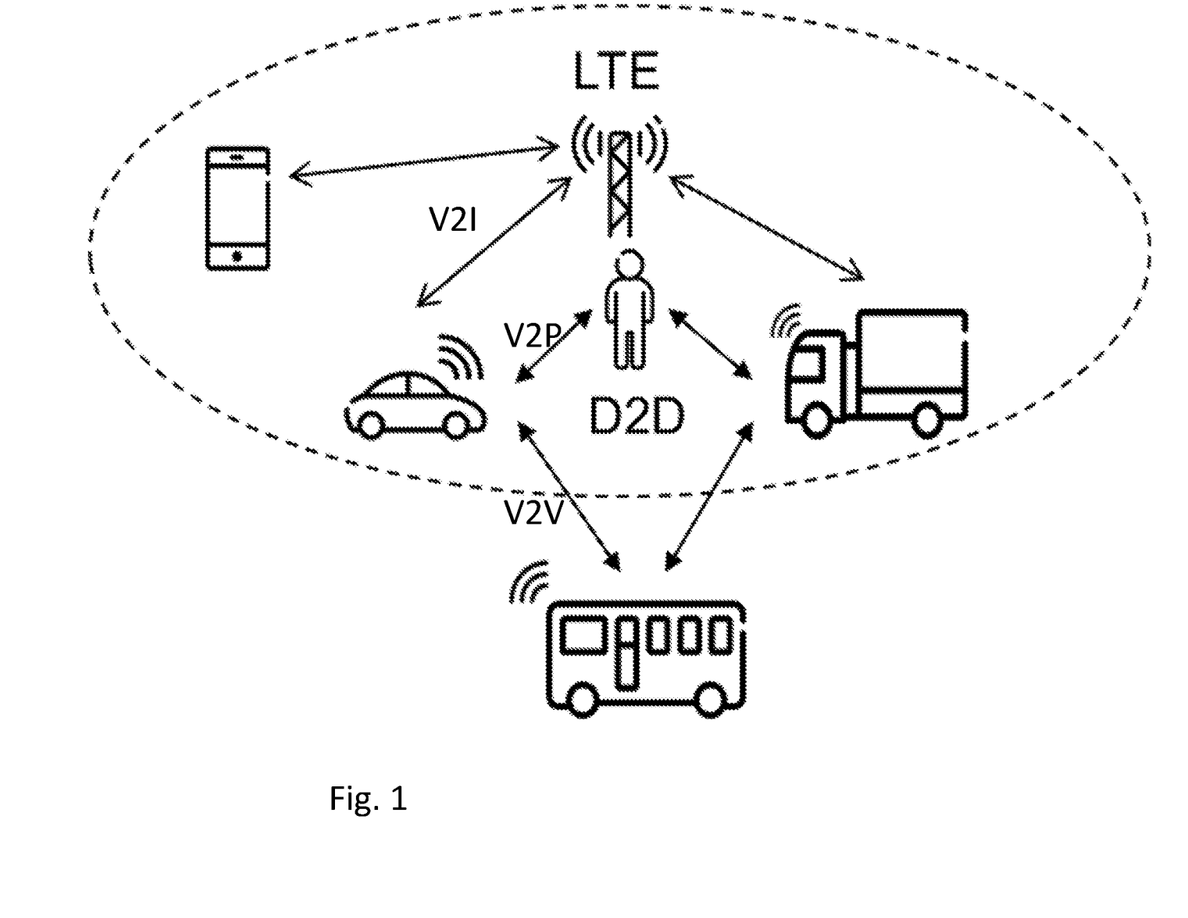
FIG. 1 is a schematic diagram illustrating V2X scenarios for an LTE-based Radio Access Network.

D2D communications may be extended to support Vehicle-to-X (V2X) communications, which includes any combination of direct communication between vehicles, pedestrian carried devices, and infrastructure mounted devices. V2x communication may take advantage of available network (NW) infrastructure, although at least basic V2x connectivity can be possible in case of lack of available network infrastructure. Providing an LTE-based V2x interface may be economically advantageous because of the LTE economies of scale and it may enable tighter integration between communications with the NW infrastructure (vehicle-to-infrastructure (V2I)), (vehicle-to-pedestrian (V2P)), and (vehicle-to-vehicle (V2V)) communications, as compared to using a dedicated V2x technology. The term side-link is used in the 3GPP specifications to refer to the transmission of messages directly between UEs; that is, without passing through an eNodeB. Sidelink is used for realizing D2D communications, V2x and x2V communications, ProSe (Proximity Services), etc. In LTE, sidelink communications take place over the PC5 interface, whereas cellular communications (i.e., uplink and downlink) take place over the Uu interface. Although the messages are exchanged directly between UEs, communication may or may not be controlled by an eNodeB. For example, the eNodeB may set pools of time-frequency resources for sidelink communications, or it may schedule the sidelink communications in specific time-frequency resources. FIG. 1 is a schematic diagram illustrating V2X scenarios for an LTE-based Radio Access Network (NW). As shown in FIG. 1, V2I (Vehicle to Infrastructure) communications may be provided between a vehicle and the radio access network (RAN), V2V (Vehicle to Vehicle) communications may be provided directly between different vehicles (without communicating through the radio access network), and V2P (Vehicle to Pedestrian) communications may be provided directly between a vehicle and a device held by the person or pedestrian (e.g., a smartphone, a tablet computer, etc.). V2X communications are meant to include any or all of V2I, V2P, and V2V communications.

V2x communications may carry both non-safety and safety information, where each of the applications and services may be associated with specific requirements sets, e.g., in terms of latency, reliability, capacity, etc.

The European Telecommunications Standards Institute (ETSI) has defined two types of messages for road safety: Co-operative Awareness Message (CAM) and Decentralized Environmental Notification Message (DENM).

A CAM message is intended to enable vehicles, including emergency vehicles, to notify their presence and other relevant parameters in a broadcast fashion. Such messages target other vehicles, pedestrians, and infrastructure, and are handled by their applications. The CAM message also serves as active assistance to safety driving for normal traffic. Devices check availability of a CAM message every 100 ms, yielding a maximum detection latency requirement is not more than 100 ms for most CAM messages. However, the latency requirement for Pre-crash sensing warning is not more than 50 ms.

A DENM message is event-triggered, such as by braking, and the availability of a DENM message is also checked for every 100 ms, and the requirement of maximum latency is not more than 100 ms.

The package size of CAM and DENM message can vary from more than 100 to more than 800 bytes, although the typical size is around 300 bytes depending on the specific V2X use case, message type (e.g. DENM can be larger than CAM), and depending on the security format included in the packet (e.g., full certificate or certificate digest). The message is supposed to be detected by all vehicles in proximity.

The Society of the Automotive Engineers (SAE) has defined a Basic Safety Message (BSM) for Dedicated Short-Range Communications (DSRC) with various defined messages sizes. Based on the importance and urgency of the messages, the BSMs are further classified into different priorities. DSRC are one-way or two-way short-range to medium-range wireless communication channels specifically designed for automotive use and a corresponding set of protocols and standards.

Radio Resource Booking

In V2x communications, two major types of traffic are distinguished: recurrent traffic and event-triggered traffic. For recurrent traffic, the transmitted packets arrive regularly (e.g., they may be strictly periodic or have some deviation from an average periodicity). One efficient way to schedule recurrent-traffic V2x transmissions is to use radio resource booking. In resource allocation using resource booking a UE can book radio resources in advance for transmitting the next packet (including all the retransmissions). The minimum time span of a booking is usually taken to be the minimum time between two consecutive packets (e.g., the minimum message periodicity). Similarly, the maximum time span of a booking is usually taken to be the maximum time between two consecutive packets (e.g., the maximum message periodicity). For example, in V2X the time interval between the generation of two consecutive CAM messages may not be lower than 100 ms (in the absence of congestion control) and may not exceed 1 s. Thus, it is reasonable to allow bookings for 100 ms, 200 ms, . . . , or 1 s, as it is currently being considered by 3GPP. Usually, the UE signals the booking information to other UEs. This allows a receiving UE to predict the future utilization of the radio resources by reading received booking messages and schedule its current transmission to avoid using the same resources. To do so, a UE needs to sense the channel for some time duration preceding the (re)selection trigger to gather booking messages. In addition, it may also be possible to transmit unbooking messages that release previously booked resources.

SUMMARY

Periodicities in LTE and V2X

LTE transmissions are organized into frames and further divided into subframes. Each frame contains 10 subframes and is identified by a number, the System Frame Number (SFN), that repeats periodically. The period is 1024 frames or equivalently 10240 subframes or milliseconds. SFN allows the different nodes to differentiate the different subframes. In this way, they know when to expect one or another type of transmission (e.g., synchronization signals, control information, etc.). In general, LTE nodes do not have a way to distinguish frames beyond the SFN period. Therefore, any periodicity in LTE must divide 10240 when measured in milliseconds. For example, a certain type of signals may be defined to come every 256 subframes. This means that in an SFN period, there are 40 repetitions of the signals. If instead they were defined to come every 255 subframes, then it would not be possible to maintain the periodicity across SFN periods since 255 does not divide 10240.

LTE V2X, scheduling will most likely be organized in periods of 100 ms. The reason is that 100 ms is the minimum interval between the generation of two V2X packets at higher layer. For example, UEs may be able to book resources for transmission in terms of multiples of 100 ms (e.g., a UE may book resources for transmission in 100 or 200 ms). The entire resource allocation protocol relies on UEs scheduling their transmission and booking their resources. In addition to this, LTE V2X will also require the transmission of periodic synchronization signals.

Clearly, 100 does not divide 10240. This means that it will be necessary to define a way of embedding the designs based on 100 ms periodicity into LTE (which is based on 10240 ms periodicity).

Problems with Existing Solutions

3GPP has encountered in the past the problem of fitting a periodicity that does not divide 10240 into LTE. During the standardization of sidelink in Release 12, periods of 200 ms were defined. To fit them into the LTE structure, the following truncation method was adopted: All D2D periods consisted of 200 ms except the last one which was shorter (truncated). This presented no problem since D2D packets were scheduled and transmitted within a D2D period. The UE simply had to take into account—when scheduling transmissions—that the last D2D period was shorter.

Figure 2:
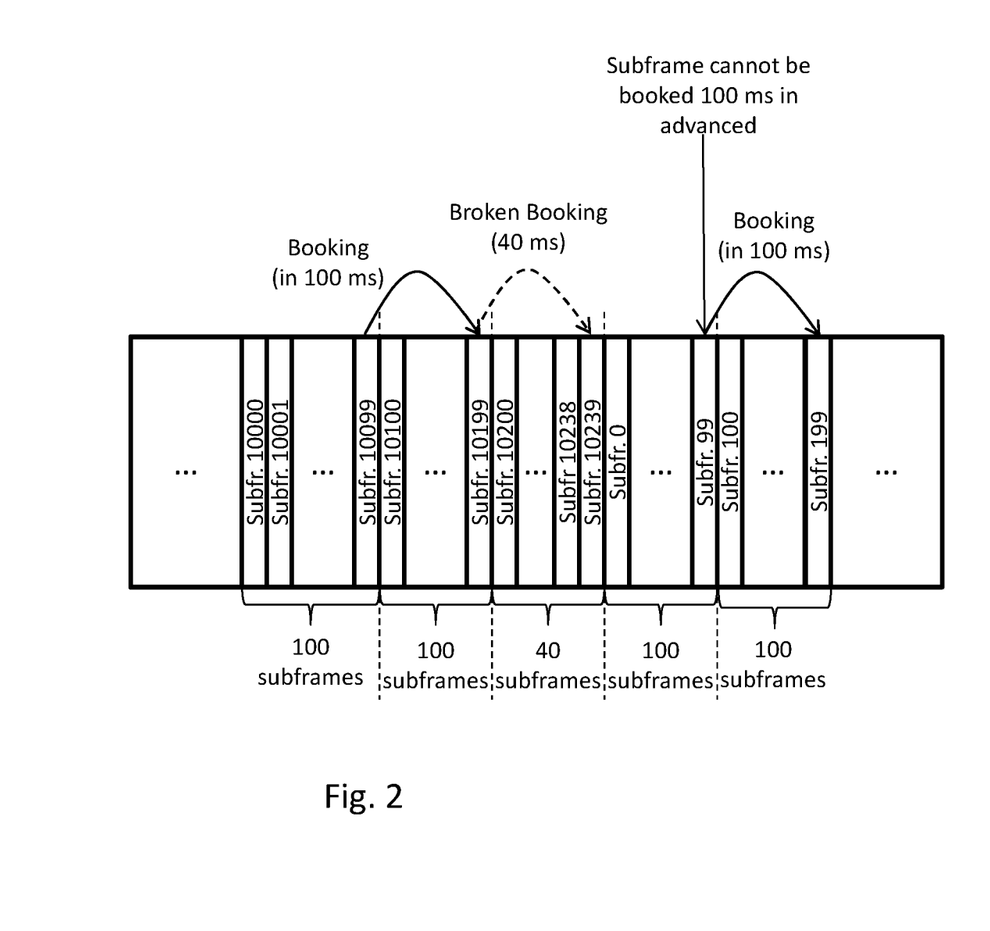
FIG. 2 is a schematic illustration of a discontinuity in a chain of bookings when a truncation is applied.

This solution cannot be applied to LTE-V2X without a significant degradation in performance. As we have mentioned before, the resource allocation protocol used in LTE V2X relies on booking. However, if truncation is applied, the chain of bookings will have a discontinuity. In some scenarios, this could mean that transmission is in practice interrupted given that the distributed resource allocation algorithm will need time to converge after such a discontinuity. This discontinuity associated with 100 subframe periodicities for D2D in LTE is illustrated in FIG. 2. In the last period, 60 subframes are missing to complete it, and this period thus only comprises 40 subframes. Bookings into the missing 60 subframes are thus not possible, and it is not possible to start the booking from those missing 60 subframes either. The latter situation is illustrated in FIG. 2 where it is indicated that subframe 99 cannot be booked 100 ms in advance, as that would require the 100 subframes in the period preceding the period of subframe 99.

Figure 3:
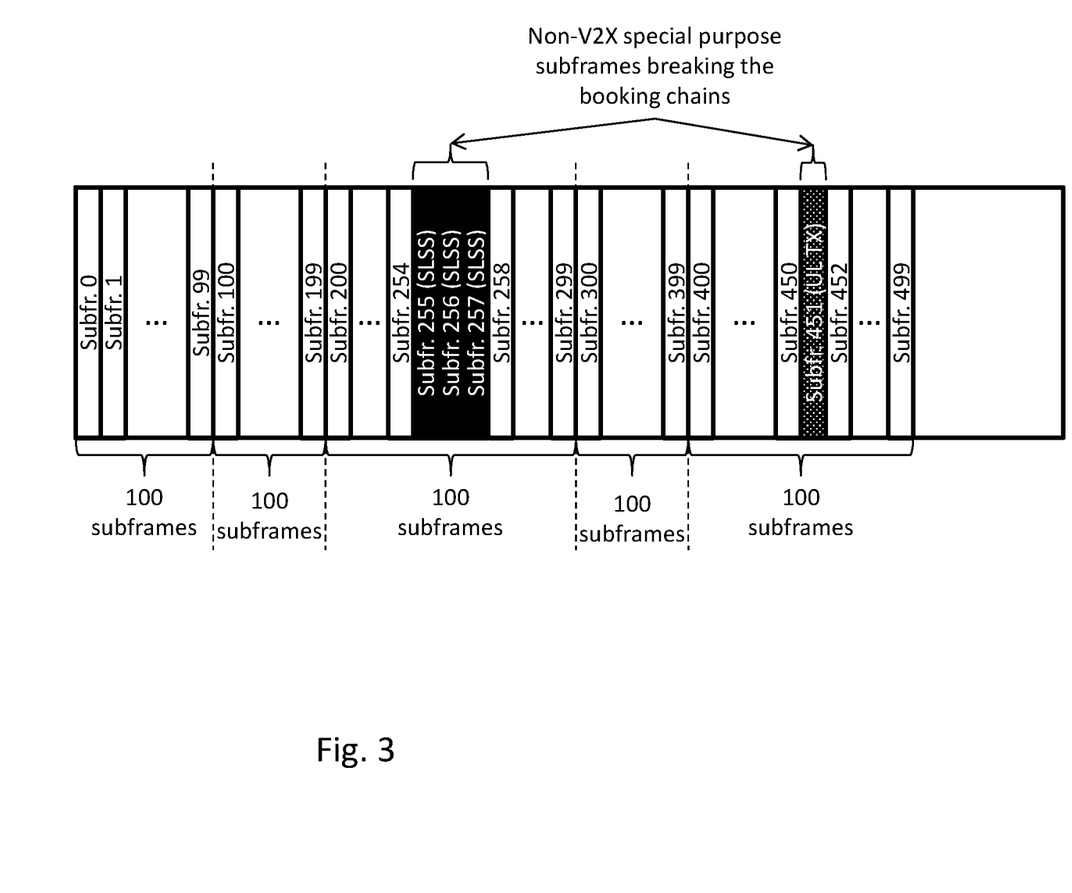
FIG. 3 is a schematic illustration of an example frame structure showing the presence of non-V2X subframes.

In addition, in the future resource bookings with a fixed offset (e.g., a booking in exactly 100 or 200 ms in the future) may not be possible. The reason is that, in LTE networks in general and in LTE V2X communications in particular, some subframes are not available for V2X transmission since they are used for other purposes (e.g., transmission of synchronization signals). We illustrate a related problem in FIG. 3, showing an example of the presence of non-V2X subframes, i.e. of the presence of subframes used for special purposes and thus not available for V2X communication. A 100-ms booking into the future from subframe 155 is not possible since subframe 255 is used for sidelink synchronization signals (SLSS). Similarly, subframe 451 is used for uplink transmissions and is therefore not available for V2X communication.

An object of embodiments is to alleviate or at least reduce one or more of the above-mentioned problems. This object and others are achieved by a method and a wireless device according to the independent claims, and by the embodiments according to the dependent claims.

According to a first aspect, the object is achieved by a method performed by a UE, for using subframes of a radio access network for a D2D communication. The method comprises determining subframes available for D2D communication among subframes of the radio access network. The subframes available for D2D communication exclude a number of subframes of the radio access network, such that a periodicity of the D2D communication in number of subframes divides the number of subframes available for D2D communication. The method also comprises using the determined subframes for enabling D2D communication.

According to a second aspect, the object is achieved by a UE, configured for using subframes of a radio access network for enabling a D2D communication. The UE is further configured to determine subframes available for D2D communication among subframes of the radio access network. The subframes available for D2D communication exclude a number of subframes of the radio access network, such that a periodicity of the D2D communication in number of subframes divides the number of subframes available for D2D communication. The UE is also configured to use the determined subframes for enabling D2D communication.

According to further aspects, the object is achieved by a computer program comprising computer readable code which when run on a UE causes the UE to perform a method according to the first aspect above, or by a computer program product comprising a computer readable medium storing the computer program.

An advantage of embodiments is that they allow for indexing the LTE subframes in a way that avoids discontinuities due to different periodicities (e.g., periodicity of packets and periodicity of the resource structure). The D2D/V2X subframes may thus be mapped onto subframes of the LTE periodic frame structure that avoids the discontinuity. In addition, embodiments allow for simple indexing of D2D-available subframes across different periods even if the available subframes are interleaved with subframes unavailable for D2D in different ways in each period.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment. Any two or more embodiments described below may be combined in any way with each other.

Embodiments of the present disclosure are described without limitation in the context of a V2X scenario for an LTE-based Radio Access Network, as shown in the block diagram of FIG. 1. The illustrated communication system includes UEs that are configured for V2x communication of packets using radio resource allocation in accordance with various embodiments of the present disclosure. The communication system includes a radio network node (e.g., a LTE eNodeB), and a plurality of UEs. The UEs can be any type of electronic device configured for D2D and/or V2x communications such as any one or more of: vehicle-to-infrastructure (V2I) communications; vehicle-to-pedestrian (V2P) communications; and vehicle-to-vehicle (V2V) communications. As used herein, D2D is referred to in a broader sense to include communications between any type of UEs, and includes V2x communications between a vehicle and any other type of UE. Example types of a UE include, but not limited to, a wireless device, a personal data assistant (PDA), tablet computer (e.g., iPAD), mobile terminal, smart phone, smart watch, laptop embedded equipped (LEE), laptop mounted equipment (LME), vehicle mounted communication device, infrastructure mounted communication device, etc.

Embodiments are described in a non-limiting general context in relation to V2X and to an LTE system. However, the described embodiments may also apply for D2D (also known as sidelink) and for other RATs than LTE, such as New Radio (NR). The embodiments are described in terms of two periodicities or periods (10240 ms as the LTE periodicity or period, and 100 ms as the V2X periodicity or period) but the principles can be applied to other periodicity or period values, more generally referred to as a first period A and a second period B. Embodiments thus applies to any case in which radio resource with a certain periodicity, or with a first period A, bigger than a second period B applied for a second set of radio resources, and for which first period A is not a multiple integer of second period B.

The V2X resources may in embodiments be in groups of 100 ms, but the UEs may operate on a minimum of 200 ms, i.e. a multiple of the period 100 ms. For pedestrians, a transmission on every 1000 ms may be possible although the period may still be in terms of 100 ms.

The example scenarios herein are described for an LTE system, and the radio resources that are sensed, booked, and allocated for enabling D2D communication correspond to subframes. Hereinafter, the terms radio resources and subframes are used interchangeably. In another radio access network, other radio resources than subframes may be used.

In LTE, 10240 ms (i.e. 10240 subframes) corresponds to the SFN period, while 100 ms might be the poolPeriod of a V2V pool. A V2V or D2D pool refers to a pool of radio resources used for e.g. one type of V2X/D2D communication service or traffic, or for one type of user equipment. A poolPeriod thus defines the periodicity of such pools of radio resources. A device in an LTE network is expected to keep track of the subframe numbers only within each SFN period, but not across SFN periods.

Embodiments comprise a method to index the subframes used in LTE V2X transmission in a way that scheduling based on 100 ms periodicities (the second period B) can be used in a system that has a 10240 ms periodicity (the first period A). To this end, 100 ms periods are defined in a way that some subframes do not belong to any V2X period. These subframes that do not belong to any period may be used to transmit other types of signals than V2X packets, e.g. synchronization signals, and/or coexistence sequences, or may be reserved for some other use.

For simplicity, in the following we refer to the case in which the periodicity or the so called second period B is 100 ms, but the invention can easily be generalized to a person skilled in the art to any periodicity or period or poolPeriod for which the SFN period or the so called first period A is not an integer multiple of said poolPeriod or second period B. The first period A being an integer multiple of the second period B, is the same thing as the second period B dividing the first period A without remainder, or simply the second period B dividing the first period A.

Design of Pools for V2V: Structure of the Pools and Indexing of the Subframes It is fundamental that UEs have a common way of referring to the subframes. Otherwise, operations like sensing, resource allocation, or booking are unclear. As explained above, LTE transmissions are organized into frames and further divided into subframes. Each frame is identified by a number that repeats periodically. The period is 1024 frames or equivalently 10240 subframes or milliseconds (defined as first period A above). In contrast, the design for V2X has considered 100 ms (and multiples thereof) as the basic periodicity since this corresponds to the smallest message periodicity (defined as second period B above). Since 10240 is not divisible by 100, it is necessary to define a way of embedding the 100 ms designs into the LTE (sub)frame structure. In addition, we have other periodicities like the one of SLSS that need to be taken into account.

It is proposed to define a logical indexing of the subframes for V2X. This indexing must be compatible with the SFN/D2D Frame Number (DFN) period and also reflect the basic (i.e., 100 ms) periodicity used by the scheduling and booking protocol. The logical indexing may be obtained in the following way, considering 10240 subframes in a SFN/DFN period:

a) For transmission of SLSS, $N_{SLSS}$ subframes are used every $T_{SLSS}$ ms. To simplify the transmitter design, $T_{SLSS}$ should divide 10240.

b) After removing the SLSS subframes, there are $10240-10240*N_{SLSS}/T_{SLSS}$ subframes left. In general, 100 will not divide this number. It is proposed to use $N=100*floor((10240-10240*N_{SLSS}/T_{SLSS})/100)$ subframes for V2X transmission. The remaining $N_{reserved}$ subframes are reserved and cannot be used for V2X transmissions (i.e. for V2X data packets or associated control signals). Thus, $N_{reserved}=10240-100*floor((10240-10240*N_{SLSS}/T_{SLSS})/100)$. The indices of the reserved subframes can be preconfigured or configured by the network.

c) The N subframes are in principle available for V2X transmission (although further restrictions may be placed by an eNodeB or other node) and are divided into $N_{V2X\text{-}periods}$ of 100 subframes each. Each period consists of 100 consecutive available subframes, possibly interleaved with SLSS and/or reserved subframes. Consequently, the subframes may be referred to as the $j^{th}$ subframe of the $i^{th}$ V2X period (where $j=\{0, \ldots, 99\}$ and $i=\{0, \ldots, N_{V2X\text{-}periods}-1\}$).

Figure 4:
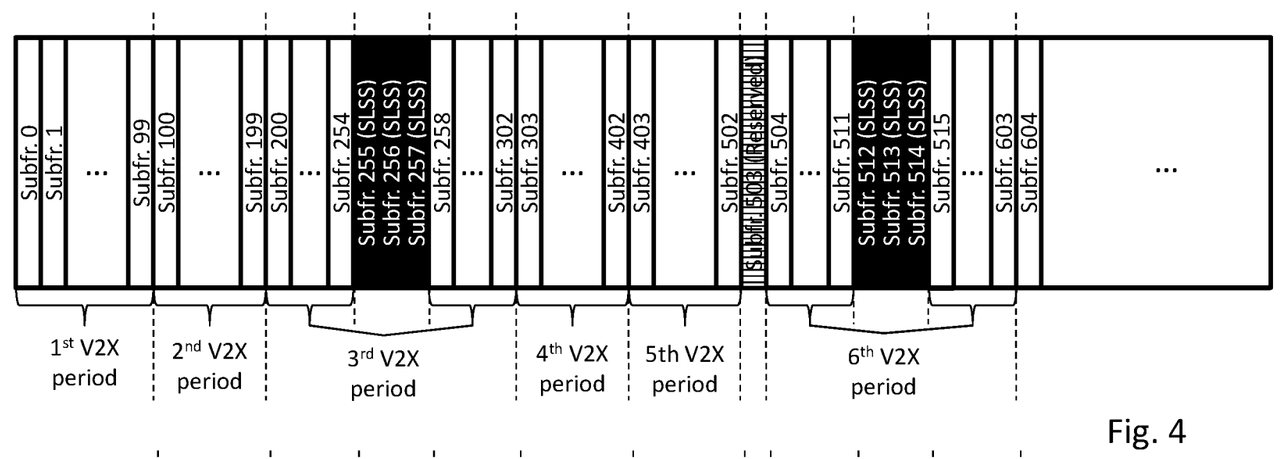
FIG. 4 is a schematic illustration of Example 1 and how the V2X subframes are mapped to the LTE SFN frame structure.

FIG. 4 illustrates an example of a subset of the 10240 subframes in a SFN/DFN period, with SLSS defined by $T_{SLSS}=256$ and $N_{SLSS}=3$. Over a period of 10240 subframes, SLSS is transmitted 40 times (in subframes 255, 256, and 257 for the first time, subframes 512, 513, and 514 for the second time, etc.). The SLSS subframes are black in FIG. 4. 10120 subframes are thus remaining after excluding the SLSS subframes, which results in 10100 subframes available for V2X transmission according to the above described procedure in step b). The remaining $N_{reserved}=20$ subframes are reserved for other use, in order to a achieve a number of subframes available for V2X communication that is divisible by 100. In the example case illustrated in FIG. 4, the reserved subframes are spread, having one reserved subframe after every 500 subframes for V2X transmission, i.e., excluding the SLSS subframes. That is, subframe 503, 1007, etc. are reserved. The remaining subframes are divided into $N_{V2X\text{-}periods}=101$ V2X periods, each of them consisting of 100 subframes. The first period consists of the subframes [0,99], the second period consists of the subframes [100, 199], the third period consists of the subframes [200,254] and [258,302] (interleaved with SLSS), and so on.

This logical indexing simplifies the specification of scheduling and booking. For example, a UE transmitting on the $j^{th}$ subframe of the $i^{th}$ V2X period may book the same frequency resource for transmission in the $j^{th}$ subframe of the $(i+1)^{th}$ V2X period. This roughly corresponds to booking in 100 ms.

This is only a way of indexing the resources available for V2X transmission. It is not intended to place any additional restriction on the way UEs can schedule their transmissions.

A 100-bit pattern may be further applied to the V2X period for different purposes, such as the following:

The pattern may be used to define a specific V2X pool (e.g., for V2P, mode 1 transmissions, mode 2 transmissions, etc.).

In the case of a carried shared between V2X and other services, the pattern may be used to identify the subframes within a V2X period that are available for V2X transmission. This pattern may be signaled by the network.

Figure 5:
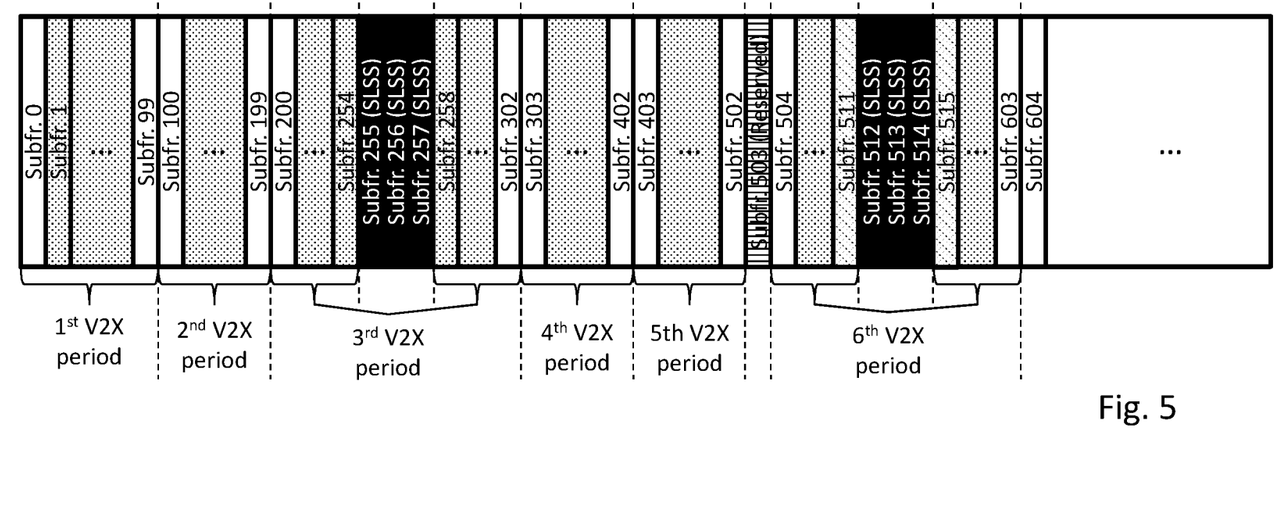
FIG. 5 is a schematic illustration of a further subdivision of the subframes available for D2D communication.

For a given purpose, the same pattern may be applied to all V2X periods (i.e., it is repeated) so that the advantages of the logical indexing are preserved. An example of the application of the 100-bit patterns is illustrated in FIG. 5. The figure indexes subframes in a similar way as in FIG. 4, and also maps the reserved subframes for transmission as in the example of FIG. 4. The subframes available for V2X transmission are divided into V2X periods each of them consisting of 100 subframes. However, within each V2X period, subframes in white (such as subframe 0, 99, in the first V2X period) are used for V2P and dotted subframes (such as subframes 1-98 in the first V2X period) are used for V2V.

The following summarizes some of the above proposed embodiments. V2X uses the following logical indexing based on V2X periods defined in the following way:

A multiple of V2X periods consisting of consecutive subframes excluding the following:
   Subframes used for transmission of SLSS ($N_{SLSS}$ subframes every $T_{SLSS}$ ms).
   $N_{reserved}$ subframes where $N_{reserved}=1024-100*floor((10240-10240*N_{SLSS}/T_{SLSS})/100)$. The indices of the reserved subframes can be preconfigured or configured by the network.
   Each V2X period consists of 100 consecutive subframes within the multiple of periods.

Furthermore, 100-bit patterns may be further applied to every V2X period to define pools of resources (e.g., for V2P, mode 1, mode 2, etc.). In shared carriers, network signaling is used to transmit the 100-bit pattern identifying the subframes available for V2X transmission.

Further Embodiments

Embodiments related to the previously described example, comprise the following method to index LTE subframes:

1. Subframes for special purposes, such as for SLSS as in the example described above with reference to FIGS. 4 and 5, are defined. Let Na<=10240 be the number of such special purposes subframes. These subframes may have a 10240 ms periodicity, or any periodicity that divides 10240, such as 256 ms periodicity. This step leaves 10240−Na subframes.

2. In general, 100 does not divide 10240−Na either. We divide the 10240−Na subframes into two groups. A first group with Nb=100*floor((10240−Na)/100) subframes, which will correspond to the subframes available for D2D or V2X communication, and a second group with the remaining Nc subframes, which will correspond to the reserved subframes. The function floor(.) rounds its arguments towards 0, and Na+Nb+Nc=10240. In this way, Nb—the number of subframes available for D2D or V2X communication—is divisible by 100.

3. The Nb subframes in the first group in Step 2 are then divided into Np=floor((10240−Na)/100) periods of 100 ms each.

A subframe in the group of Nb subframes cannot belong to any of the groups with Na or Nc subframes.

In the following, some possible example embodiments are discussed in order to further illustrate the embodiments and their advantages.

Example Embodiments

In some embodiments, the subframes for special purposes (Na) from Step 1 above include one or more the following:
Subframes used for transmission of periodic signals, with a periodicity P<10240 such that P divides 10240. E.g., synchronization signals or periodic system control information transmissions.
Subframes used for transmission of other types of traffic. For example, a special pool for transmission by a specific type of UEs (e.g., pedestrian) may be defined.
Subframes that may be unusable due to limitations in the device capabilities when e.g. interrupting the operation when readjusting RF parameters (e.g., when switching carrier).

In some embodiments, the subframes belonging to the second group (Nc) in Step 2 above have one or more of the following purposes:
They are used for transmission of specific sequences (e.g., sequences enabling coexistence between different technologies).
They are reserved for future uses.

In some embodiments, the subframes in the first group in Step 2 (i.e. the subframes available for V2X communication, Nb) are further divided into subgroups, to form different pools of resources as described previously. In some further embodiments, this further division is done by applying a bitmap to the first group of subframes in Step 2 (see also example described above where a 100-bit pattern is used for the purpose). In some further embodiments, this bitmap may be defined in the standard specifications, may be preconfigured, or may be configured by a network node. The division into subgroups may have one or more of the following purposes:
Defining pools with disjoint resources (i.e., orthogonal pools) for different types of services (e.g., V2X, D2D, cellular, etc.).
Defining pools with disjoint resources (i.e., orthogonal pools) for different types of traffic (e.g., urgent, best effort, etc.) or for types of traffic with different characteristics (scheduled by a UE, scheduled by the network, etc.)

Example 1

An LTE V2X system is considered in which three subframes are used for transmitting SLSS every 256 ms (where 256 divides 10240). This corresponds to the example described previously with $T_{SLSS}$=256 and $N_{SLSS}$=3. SLSS are transmitted using the Na subframes (3*40=120). Consequently, Na=120, Nb=10100, Nc=20, and Np=101. The Nc subframes in the second group of Step 2 above, are subframes reserved for future use and they are spread among the subframes in the first group, that is interleaved with subframes available for V2X communication. That is, there is one subframe from the second group after every 500 subframes from the first group. This is illustrated in FIG. 4. The special purposes subframes defined in Step 1 above are marked with (SLSS) in the name. The subframe(s) in the second group in Step 2 is marked with (reserved) in the name. The periods defined in Step 3 above are here labelled as 'V2X periods'. The V2X periods are thus the periods of in total 100 ms mapped onto the LTE frame structure, e.g. as illustrated in FIG. 4. The indexing allows UEs to book resources without ambiguities. For example, a UE transmitting in the last subframe of the 1st V2X period (subfr. 99) may book the same resources in the 2nd and 3rd V2X periods. Note that in the first case this corresponds to subframe 199 whereas in the second case this corresponds to subframe 302 due to the presence of the SLSS subframes, which are used for other purposes. This illustrates that booking cannot be done in a straightforward manner unless an appropriate mapping to subframes is defined.

In addition, the indexing would allow for booking from the 101st V2X to the 1st or 2nd V2X periods, since all the periods consist of 100 subframes. In contrast, with the truncation solution described previously in the background section the last period would contain less than 100 subframes, and a discontinuity in the booking procedure would arise with such a solution.

Example 2

The system of Example 1 may in another example embodiment apply a further subdivision of the subframes in the first group, i.e. of the subframes available for V2X communication. In this case, the first and last subframes of every period belong to one subdivision, and the rest of subframes belong to a second subdivision. Subframes in the first subdivision may be used for transmissions by pedestrians and subframes in the second subdivision may be used for transmissions by vehicles. This example is illustrated in FIG. 5. The subframes in the first subdivision are in white without any pattern. The subframes in the second subdivision are marked with a dotted pattern.

Embodiments of Methods Described with Reference to FIGS. 6a-b

Various embodiments of the present disclosure are directed to methods and operations of a UE for using a radio resource of a radio access network (such as a subframe of an LTE access network) for enabling D2D communication (a D2D transmission or D2D reception or both D2D transmission and reception) such as V2V communication.

Figure 6A:
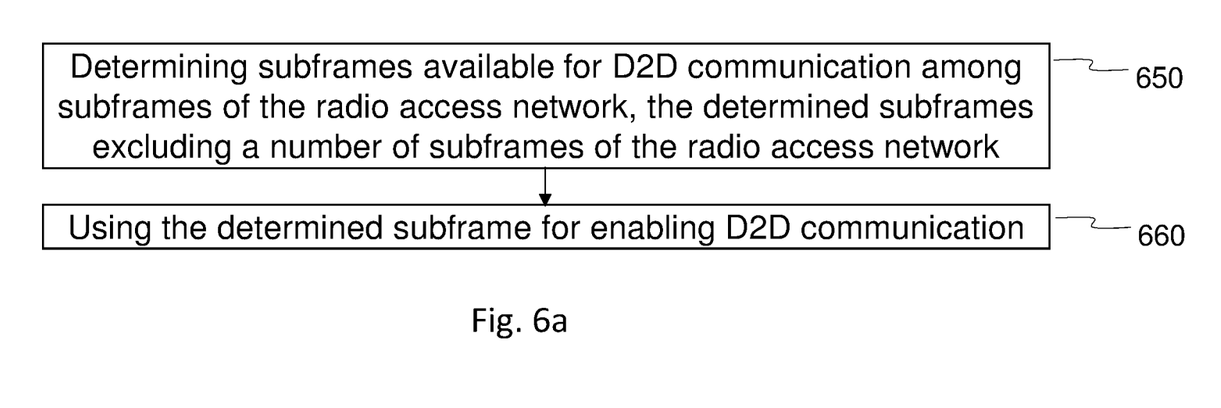
FIGS. 6a-b are flowcharts illustrating the method in a UE according to embodiments.

FIG. 6a is a flowchart illustrating one embodiment of a method performed by a UE, for using subframes of a radio access network for a D2D communication. The subframes of the radio access network may be organised in a periodic structure with a period A. As described previously, the radio access network may be an LTE network, and the period A may be 10240 ms, while the period of the D2D communication may be 100 ms. In embodiments, a number of subframes of a periodicity of the D2D communication does not divide the number of subframes of the period A. As described above 100 does not divide 10240 without remainder. The method comprises:

650: Determining subframes available for D2D communication among subframes of the radio access network. The subframes available for D2D communication, (see Nb in previous embodiments), exclude a number of subframes of the radio access network (see Na and Nc in previous embodiments), such that a periodicity of the D2D communication in number of subframes divides the number of subframes available for D2D communication. The excluded number of subframes of the radio access network may comprise a number of reserved subframes (Nc), and/or a number of subframes used for special purposes (Na). At least one of the subframes used for special purposes may be used for transmission of synchronization signals, or for transmission of other than D2D communication packets. At least one of the reserved subframes may be used for transmitting a detection sequence advertising the use of D2D communication on a carrier. There may be x number of subframes available for D2D communication between two consecutive reserved subframes. This is illustrated in FIG. 5, where x=500.

660: Using the determined subframes for enabling D2D communication. Using the determined subframes may comprise at least one of sensing, allocating, and booking the determined subframes for enabling D2D communication.

The step 650 of determining the subframes available for D2D communication may in embodiments comprise determining the number of subframes available for D2D communication, Nb, to be equal to $y*floor((z-Na)/y)$, where y is the periodicity of the D2D communication in number of subframes, z is a number of subframes in a period A of a periodic structure of the radio access network, Na is the number of subframes used for special purposes, and floor( ) is a function that takes as input a real number and gives as output the greatest integer that is less than or equal to the real number.

In further embodiments of the method, the subframes available for D2D communication may be divided into subgroups by applying a bitmap to the subframes available for D2D communication. This was described previously with reference to FIG. 5, where a 100-bit pattern was applied to divide the Nb subframes available for D2D communication into two different pools of subframes.

Figure 6B:
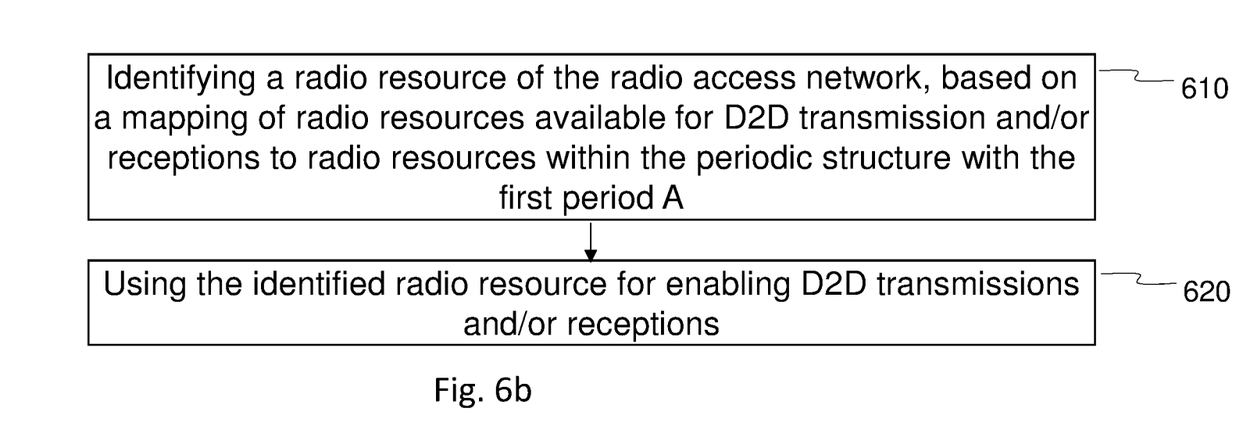

In other embodiments of the method, illustrated in FIG. 6b, the radio resources of the radio access network are organised in a periodic structure with a first period A (such as SFN period of 10240 ms or subframes), and a D2D communication service allocates sets of radio resources with a second period B (such as a poolPeriod of a V2V pool, e.g. with a 100 ms or subframes period) or a multiple of the second period B (e.g. 2*100 ms=200 ms or subframes) for D2D transmissions and/or receptions. The number of radio resources of the first period A is larger than the number of radio resources of the second period B and the number of radio resources of the second period B does not divide the number of radio resources of the first period A. The method comprises the following:

610: Identifying a radio resource of the radio access network, based on a mapping of radio resources available for D2D transmission and/or reception to radio resources within the periodic structure with the first period A, wherein the radio resources available for D2D transmission and/or reception are chosen to exclude a number of radio resources of the periodic structure such that the number of resources of the second period B divides the number of radio resources available for D2D transmission and/or reception, and

620: using the identified radio resource for enabling D2D transmissions and/or reception.

Embodiment of the User Equipment Described with Reference to FIG. 7

Figure 7:
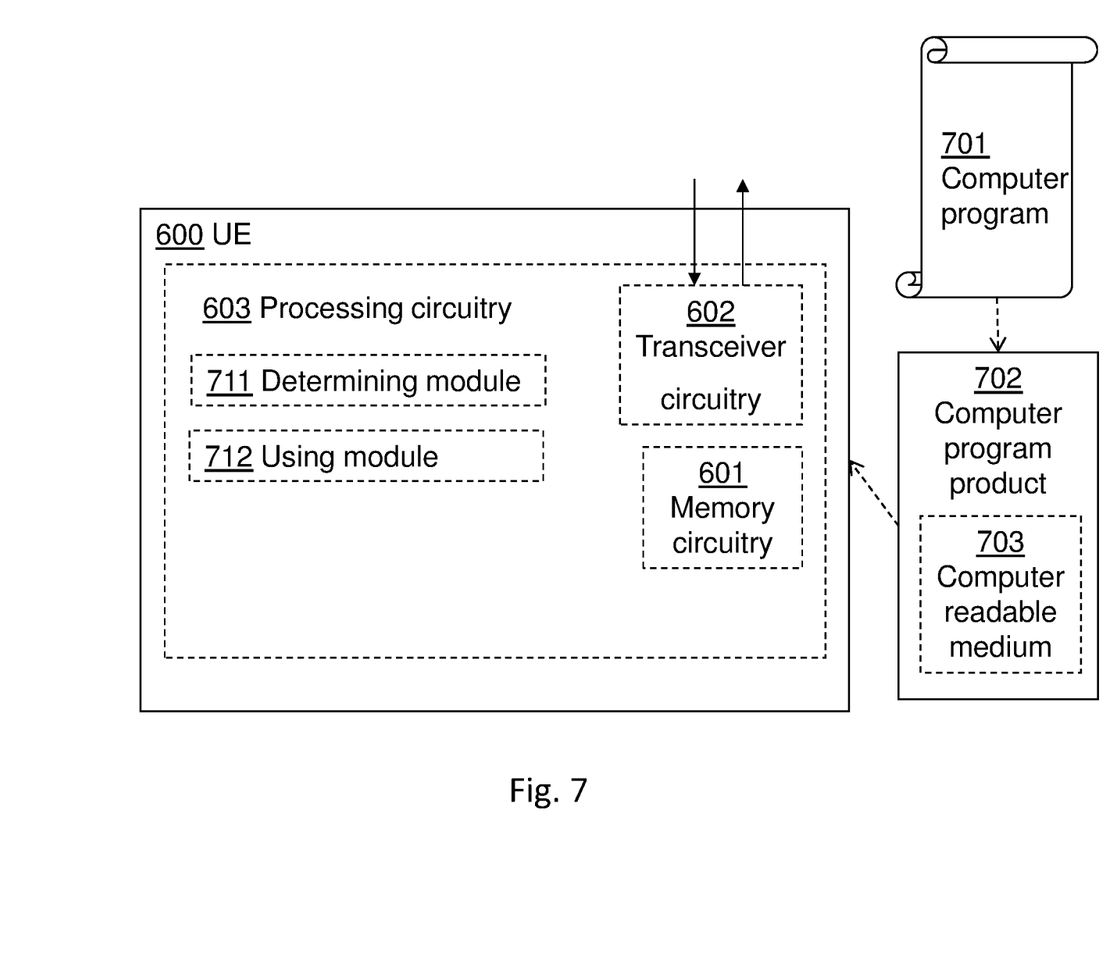
FIG. 7 is a block diagram schematically illustrating a UE according to embodiments.

FIG. 7 is a block diagram of a UE 600 according to embodiments. The UE may be configured to perform operations according to one or more embodiments disclosed herein.

According to a first embodiment, the UE is configured for using subframes of a radio access network for enabling a D2D communication. The UE is further configured to determine subframes available for D2D communication among subframes of the radio access network, wherein the subframes available for D2D communication exclude a number of subframes of the radio access network, such that a periodicity of the D2D communication in number of subframes divides the number of subframes available for D2D communication. The UE is also configured to use the determined subframes for enabling D2D communication.

In embodiments, the UE may be configured to use the determined subframes by sensing, allocating, and/or booking the determined subframes for enabling D2D communication. The excluded number of subframes of the radio access network may comprise a number of reserved subframes, and/or a number of subframes used for special purposes. At least one of the subframes used for special purposes may be used for transmission of synchronization signals, or for transmission of other than D2D communication packets.

In embodiments, the UE may be configured to determine the subframes available for D2D communication by determining the number of subframes available for D2D communication, Nb, to be equal to $y*floor((z-Na)/y)$. y is the periodicity of the D2D communication in number of subframes, z is a number of subframes in a period A of a periodic structure of the radio access network, Na is the number of subframes used for special purposes, and floor( ) is a function that takes as input a real number and gives as output the greatest integer that is less than or equal to the real number.

The UE may be further configured to use at least one of the reserved subframes for transmitting a detection sequence advertising the use of D2D communication on a carrier. There may be x number of subframes available for D2D communication between two consecutive reserved subframes.

The UE may be further configured to divide the subframes available for D2D communication into subgroups by applying a bitmap to the subframes available for D2D communication.

In embodiments, the subframes of the radio access network may be organized in a periodic structure with a period A. In embodiments, the number of subframes of the periodicity of the D2D communication does not divide the number of subframes of the period A.

As illustrated in FIG. 7, the UE 600 may comprise at least one processing circuitry 603 and optionally also a memory 601. The processing circuitry 603 may include one or more data processing circuits, such as a general purpose and/or special purpose processor, e.g., microprocessor and/or digital signal processor. In embodiments, the memory 601 may be placed in some other node or unit, or at least separately from the UE. The UE 600 may also comprise one or more input/output (I/O) units such as a transceiver circuitry 602 configured to communicate with other UEs over sidelink, or with a network node. The UE 600 may further include antenna ports and antenna, a display, a user input interface, and a speaker. The UE may be configured for using subframes of a radio access network for enabling a D2D communication. The UE may comprise a radio transceiver circuitry 602 configured to communicate wirelessly with another UE, a processing circuitry 603 operatively associated with the transceiver circuitry, and a memory 601 operatively associated with the processing circuitry. The memory may comprise instructions executable by the processing circuitry whereby said UE is operative to determine subframes available for D2D communication among subframes of the radio access network. The subframes available for D2D communication exclude a number of subframes of the radio access network, such that a periodicity of the D2D communication in number of subframes divides the number of subframes available for D2D communication. The UE may be further operative to use the determined subframes for enabling D2D communication.

In embodiments, the UE may be further operative to perform any of the methods or operations previously described herein.

In another embodiment also illustrated in FIG. 7, the UE 600 may comprise a determining module 711 adapted to determine subframes available for D2D communication among subframes of the radio access network as described previously, and a using module 712 adapted to use the determined subframes for enabling D2D communication. In embodiments, the UE may comprise further modules adapted to perform any of the methods or operations previously described herein. The modules described above are functional units which may be implemented in hardware, software, firmware or any combination thereof. In one embodiment, the modules are implemented as a computer program running on the at least one processing circuitry 603.

In still another alternative way to describe the embodiment in FIG. 7, the UE 600 may comprise a Central Processing Unit (CPU) which may be a single unit or a plurality of units. Furthermore, the UE may comprise at least one computer program product (CPP) 702 with a computer readable medium 703 in the form of a non-volatile memory, e.g. an EEPROM (Electrically Erasable Programmable Read-Only Memory), a flash memory or a disk drive. The CPP may comprise a computer program 701 stored on the computer readable medium 703, which comprises code means which when run on the CPU of the UE 600 causes the UE to perform the methods described earlier in conjunction with FIG. 6a-b. In other words, when said code means are run on the CPU, they correspond to the at least one processing circuitry 603 of the UE 600 in FIG. 7.

The UE 600 in FIG. 7 may in another example embodiment comprise an identifying module and a using module. The identifying module may be adapted to identify a radio resource of the radio access network, based on a mapping of radio resources available for D2D transmission to radio resources within the periodic structure with the first period A, wherein the radio resources available for D2D transmission are chosen to exclude a number of radio resources of the periodic structure such that the number of resources of the second period B divides the number of radio resources available for D2D transmission, and the using module may be adapted to use the identified radio resource for enabling D2D transmissions. The modules described above are functional units which may be implemented in hardware, software, firmware or any combination thereof. In one embodiment, the modules are implemented as a computer program running on the at least one processor circuit 603.

Further Definitions and Embodiments

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

Also in some embodiments, a generic terminology such as a "radio network node" or simply a "network (NW) node" is used. It can be any kind of network node such as a base station, radio base station, base transceiver station, base station controller, network controller, evolved NodeB, NodeB, RNC, relay node, positioning node, E-SMLC, location server, repeater, access point, radio access point, Remote Radio Unit (RRU) Remote Radio Head (RRH), multi-standard radio (MSR) radio node such as MSR BS nodes in distributed antenna system (DAS), SON node, O&M, OSS, MDT node, Core network node, MME, or even an external node (e.g., 3rd party node, or a node external to the current network).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present disclosure may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and sub-combination of these embodiments. Accordingly, the present specification, including the drawings, shall be construed to constitute a complete written description of various example combinations and sub-combinations of embodiments and of the manner and process of making and using them, and shall support claims to any such combination or sub-combination.

Many variations and modifications can be made to the embodiments without substantially departing from the principles of the present invention. All such variations and modifications are intended to be included herein within the scope of the present invention.

List of Example Embodiments

1. A method performed by a user equipment, UE, for using a radio resource of a radio access network for enabling a Device-to-Device, D2D, transmission and/or reception, wherein radio resources of the radio access network are organised in a periodic structure with a first period A, and a D2D communication service allocates sets of radio resources with a second period B or a multiple of the second period B for D2D transmissions and/or receptions, wherein the number of radio resources of the first period A is larger than the number of radio resources of the second period B and the number of radio resources of the second period B does not divide the number of radio resources of the first period A, the method comprising:
   identifying a radio resource of the radio access network, based on a mapping of radio resources available for D2D transmission and/or reception to radio resources within the periodic structure with the first period A, wherein the radio resources available for D2D transmission and/or reception are chosen to exclude a number of radio resources of the periodic structure such that the number of resources of the second period B divides the number of radio resources available for D2D transmission and/or reception, and
   using the identified radio resource for enabling D2D transmissions and/or receptions.
2. The method of embodiment 1, wherein using the identified radio resource for enabling D2D transmissions and/or receptions comprises at least one of sensing, allocating, and booking the identified radio resource for enabling D2D transmissions and/or receptions.
3. The method of any of embodiments 1-2, wherein the excluded radio resources are mapped to radio resources regularly distributed over the periodic structure with the first period A.
4. The method of any of embodiments 1-3, wherein at least some of the excluded radio resources are used for the purpose of transmitting a detection sequence used to advertise the use of D2D or V2V communication on a carrier for enabling coexistence between different technologies.
5. The method of any of embodiments 1-4, wherein at least some of the excluded radio resources are used for special purposes and have a periodicity that divide the periodicity of the first period A.
6. The method of embodiment 5, wherein the radio resources used for special purposes are used for transmission of at least one of the following: synchronization signals; periodic system control information; traffic from other types of UEs.
7. The method of any of embodiments 1-6, wherein the radio resources available for D2D transmission and/or reception are divided into subgroups by applying a bitmap to the radio resources to form disjoint radio resources.
8. The method of embodiment 7, wherein the bitmap is defined in the standard specifications, is pre-configured, or is configured by a network node.

9. A user equipment, UE, configured for using a radio resource of a radio access network for enabling a Device-to-Device, D2D, transmission and/or reception, the UE being further configured to perform the method according to any of embodiments 1-8.

10. The UE of embodiment 9, comprising a radio transceiver circuitry configured to communicate wirelessly with another radio network node or UE, a processing circuitry operatively associated with the transceiver circuitry, and a memory operatively associated with the processing circuitry, wherein the memory comprises instructions executable by the processing circuitry whereby said UE is operative to perform the method according to any of embodiments 1-8.

11. A computer program comprising computer readable code which when run on a UE causes the UE to perform a method according to any of embodiments 1-8.

12. A computer program product comprising a computer readable medium and a computer program according to claim 11, wherein the computer program is stored on the computer readable medium.

ABBREVIATIONS AND EXPLANATIONS

3G Third Generation of Mobile Telecommunications Technology
BSM Basic Safety Message
BW Bandwidth
CAM Cooperative Awareness Message
CDMA Code-Division Multiple Access
D2D Device-to-Device Communication
DENM Decentralized Environmental Notification Message
DSRC Dedicated Short-Range Communications
eNB eNodeB
ETSI European Telecommunications Standards Institute
FDMA Frequency-Division Multiple Access
GLONASS Global Navigation Satellite System
GSM Global System for Mobile Communications
GPS Global Positioning System
LTE Long-Term Evolution
NW Network
OFDM Orthogonal-Frequency-Division Multiplexing
PSBCH Physical Sidelink Broadcast Channel
TA Timing Advance
TDMA Time-Division Multiple Access
TF Transport Format
UTC Coordinated Universal Time
SAE Society of the Automotive Engineers
UE User Equipment
V2I Vehicle-to-Infrastructure
V2P Vehicle-to-Pedestrian
V2V Vehicle-to-vehicle communication
V2x Vehicle-to-anything-you-can-imagine

What is claimed:

1. A method performed by a user equipment (UE) for using subframes of a radio access network for Device-to-Device (D2D) communication, the method comprising:
   determining a set of subframes available for use in the D2D communication from among subframes of the radio access network other than those used for special purposes, such that the set of subframes available for the D2D communication excludes a number of subframes of the radio access network, such that a periodicity of the D2D communication in number of subframes evenly divides the number of subframes in the set; and
   using the determined subframes for enabling the D2D communication.

2. The method of claim 1, wherein using the determined subframes comprises at least one of sensing, allocating, and booking the determined subframes for enabling the D2D communication.

3. The method of claim 1, wherein the excluded number of subframes of the radio access network comprise a number of reserved subframes.

4. The method of claim 3, wherein at least one of the reserved subframes are used for transmitting a detection sequence advertising the use of the D2D communication on a carrier.

5. The method of claim 3, wherein there are x number of subframes available for the D2D communication between two consecutive reserved subframes.

6. The method of claim 1, wherein at least one of the subframes used for special purposes is used for transmission of synchronization signals, or for transmission of other than D2D communication packets.

7. The method of claim 1, wherein determining the set of subframes available for the D2D communication comprises determining the number of subframes available for the D2D communication, Nb, to be equal to $y*\text{floor}((z-Na)/y)$, where y is the periodicity of the D2D communication in number of subframes, z is a number of subframes in a period A of a periodic structure of the radio access network, Na is the number of subframes used for special purposes, and floor( ) is a function that takes as input a real number and gives as output the greatest integer that is less than or equal to the real number.

8. The method of claim 1, wherein the subframes available for the D2D communication are divided into subgroups by applying a bitmap to the subframes available for the D2D communication.

9. The method of claim 1, wherein the subframes of the radio access network are organized in a periodic structure with a period A.

10. The method of claim 9, wherein the number of subframes of the periodicity of the D2D communication does not divide the number of subframes of the period A.

11. The method of claim 1, wherein a subframe is a radio resource.

12. A user equipment (UE) configured for using subframes of a radio access network for enabling Device-to-Device (D2D) communication, the UE comprising:
   a radio transceiver circuitry configured to communicate wirelessly with another UE;
   processing circuitry operatively associated with the transceiver circuitry;
   and a memory operatively associated with the processing circuitry, wherein the memory comprises instructions executable by the processing circuitry whereby said UE is configured to:
      determine a set of subframes available for use in the D2D communication from among subframes of the radio access network other than those used for special purposes, such that the set of subframes available for the D2D communication excludes a number of subframes of the radio access network, such that a periodicity of the D2D communication in number of subframes evenly divides the number of subframes in the set; and
      use the determined subframes for enabling the D2D communication.

13. The UE of claim 12, wherein the memory comprises instructions executable by the processing circuitry whereby said UE is configured to use the determined subframes by one or more of: sensing, allocating, and booking the determined subframes for enabling the D2D communication.

14. The UE of claim 12, wherein the excluded number of subframes of the radio access network comprise a number of reserved subframes.

15. The UE of claim 14, wherein the memory comprises instructions executable by the processing circuitry whereby said UE is configured to use at least one of the reserved subframes for transmitting a detection sequence advertising the use of the D2D communication on a carrier.

16. The UE of claim 14, wherein there are x number of subframes available for the D2D communication between two consecutive reserved subframes.

17. The UE of claim 12, wherein at least one of the subframes used for special purposes is used for transmission of synchronization signals, or for transmission of other than D2D communication packets.

18. The UE of claim 12, wherein the memory comprises instructions executable by the processing circuitry whereby said UE is configured to determine the subframes available for the D2D communication by determining the number of subframes available for the D2D communication, Nb, to be equal to y*floor((z−Na)/y), where y is the periodicity of the D2D communication in number of subframes, z is a number of subframes in a period A of a periodic structure of the radio access network, Na is the number of subframes used for special purposes, and floor( ) is a function that takes as input a real number and gives as output the greatest integer that is less than or equal to the real number.

19. The UE of claim 12, wherein the memory comprises instructions executable by the processing circuitry whereby said UE is configured to divide the subframes available for the D2D communication into subgroups by applying a bitmap to the subframes available for the D2D communication.

20. The UE of claim 12, wherein the subframes of the radio access network are organized in a periodic structure with a period A.

21. The UE of claim 20, wherein the number of subframes of the periodicity of the D2D communication does not divide the number of subframes of the period A.

22. The UE of claim 12, wherein a subframe is a radio resource.

23. A non-transitory computer-readable medium comprising, stored thereupon, a computer program comprising computer readable code that, when executed on a processor of a user equipment (UE), causes the UE to:
determine a set of subframes available for use in the D2D communication from among subframes of the radio access network other than those used for special purposes, such that the set of subframes available for the D2D communication excludes a number of subframes of the radio access network, such that a periodicity of the D2D communication in number of subframes evenly divides the number of subframes in the set; and
use the determined subframes for enabling the D2D communication.

\* \* \* \* \*